United States Patent [19]

Ivey et al.

[11] Patent Number: 5,073,154
[45] Date of Patent: Dec. 17, 1991

[54] CHAIN-BELT

[75] Inventors: John S. Ivey, Ithaca; Paul M. Bateman, Freeville; Julius A. Clauss; Edward H. Cole, Jr., both of Ithaca; Philip J. Mott, Dryden, all of N.Y.

[73] Assignee: Borg-Warner Corporation, Chicago, Ill.

[21] Appl. No.: 532,201

[22] Filed: Jun. 1, 1990

Related U.S. Application Data

[60] Continuation of Ser. No. 416,704, Oct. 3, 1989, Pat. No. 5,009,631, which is a division of Ser. No. 356,617, May 23, 1989, Pat. No. 4,911,682, which is a continuation of Ser. No. 114,335, Oct. 28, 1987, abandoned.

[51] Int. Cl.$^5$ ............................................. F16G 13/02
[52] U.S. Cl. ..................................... 474/213; 474/214
[58] Field of Search ............................... 474/213–217, 474/201, 237, 242, 244, 245

[56] References Cited

U.S. PATENT DOCUMENTS

| | | | |
|---|---|---|---|
| 1,561,676 | 11/1925 | Wertman . | |
| 1,563,065 | 11/1925 | Belcher . | |
| 1,564,798 | 12/1925 | Sturtevant | 474/214 X |
| 1,678,450 | 7/1928 | Sturtevant | 474/214 X |
| 1,734,688 | 11/1929 | Morse . | |
| 2,047,833 | 7/1936 | Pierce | 74/251 |
| 2,223,314 | 11/1940 | Cumfer | 74/243 |
| 2,651,211 | 9/1953 | Karig | 74/236 |
| 4,186,617 | 2/1980 | Avramidis et al. | 74/245 |
| 4,313,730 | 2/1982 | Cole, Jr. et al. | 474/201 |
| 4,386,921 | 6/1983 | Roberts | 474/201 |
| 4,386,922 | 6/1983 | Ivey | 474/201 |
| 4,392,843 | 7/1983 | Smit | 474/245 |
| 4,464,152 | 8/1984 | Kern | 474/245 |
| 4,498,892 | 2/1985 | Huntley | 474/242 |
| 4,507,106 | 3/1985 | Cole, Jr. | 474/215 |
| 4,512,754 | 4/1985 | Cole, Jr. et al. | 474/245 |
| 4,516,963 | 5/1985 | Mott | 474/245 |
| 4,516,964 | 5/1985 | laster | 474/245 |
| 4,516,965 | 5/1985 | Mott | 474/245 |
| 4,526,559 | 7/1985 | Smirl | 474/201 |
| 4,526,560 | 7/1985 | Swain | 474/242 |
| 4,547,182 | 10/1985 | Rattunde | 474/214 |
| 4,553,953 | 11/1985 | Bock | 474/201 |
| 4,569,671 | 2/1986 | Ledvina | 474/201 |
| 4,580,099 | 4/1986 | Ledford | 474/201 |
| 4,581,000 | 4/1986 | Ferfecki | 474/201 |
| 4,622,025 | 11/1986 | Kern et al. | 474/245 |
| 4,645,479 | 2/1987 | Bateman et al. | 474/242 |
| 4,650,445 | 3/1987 | Mott | 474/201 |
| 4,692,130 | 9/1987 | Novak | 474/201 |
| 4,708,701 | 11/1987 | Cole, Jr. | 474/245 |
| 4,718,880 | 1/1988 | Zimmer | 474/201 |
| 4,764,158 | 8/1988 | Honda et al. | 474/212 |
| 4,767,388 | 8/1988 | Tatara et al. | 474/245 |
| 4,795,409 | 1/1989 | Okuwaki et al. | 474/245 |
| 4,871,344 | 10/1989 | Morisawa | 474/215 X |
| 4,904,231 | 2/1990 | Zimmer | 474/214 |

FOREIGN PATENT DOCUMENTS 686714 9/1950 United Kingdom .
2185300 7/1987 United Kingdom .

Primary Examiner—Thuy M. Bui
Attorney, Agent, or Firm—Hugh A. Abrams; Greg Dziegielewski

[57] ABSTRACT

A chain-belt for engagement with the pulleys of a continuously variable transmission consists of interleaved sets of chain links joined for articulation by a joint which has a rocking action. The joint includes a pair of pins. A small camber is introduced into one or both of the pins to create a spring load between the pins and the links to retain the pins in the chain during handling and assembly. Each chain link includes a pair of spaced apertures adjacent the opposite ends; each aperture has a generally hour-glass shape with the enlarged ends receiving the pins. Also, each chain link has a pair of oppositely disposed tabs adjacent one end with the location of the tabs on the links alternating on adjacent links of each set. In addition the outermost two links of each set of links had a width substantially less than the width of the inner links in that same set.

21 Claims, 2 Drawing Sheets

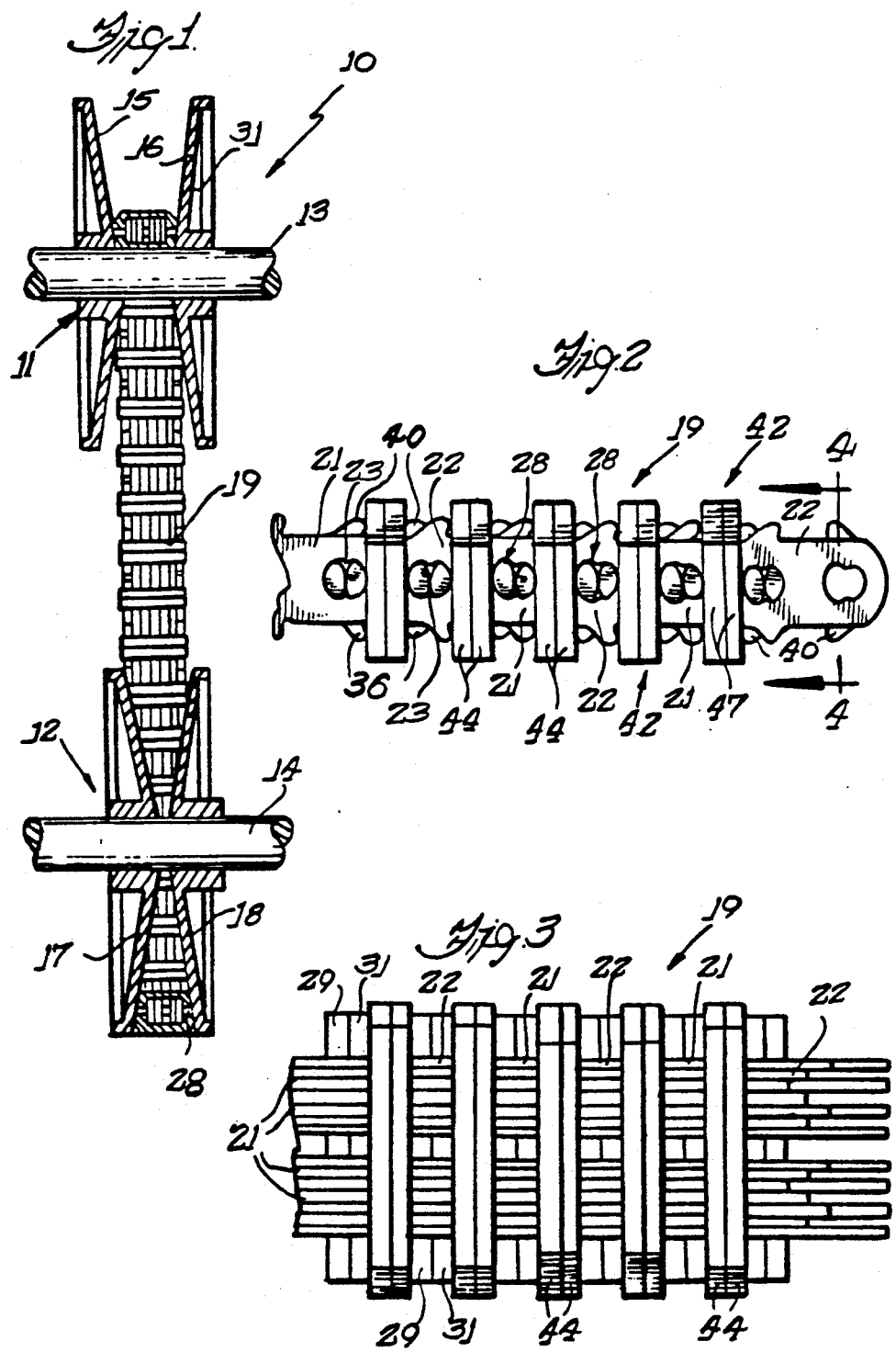

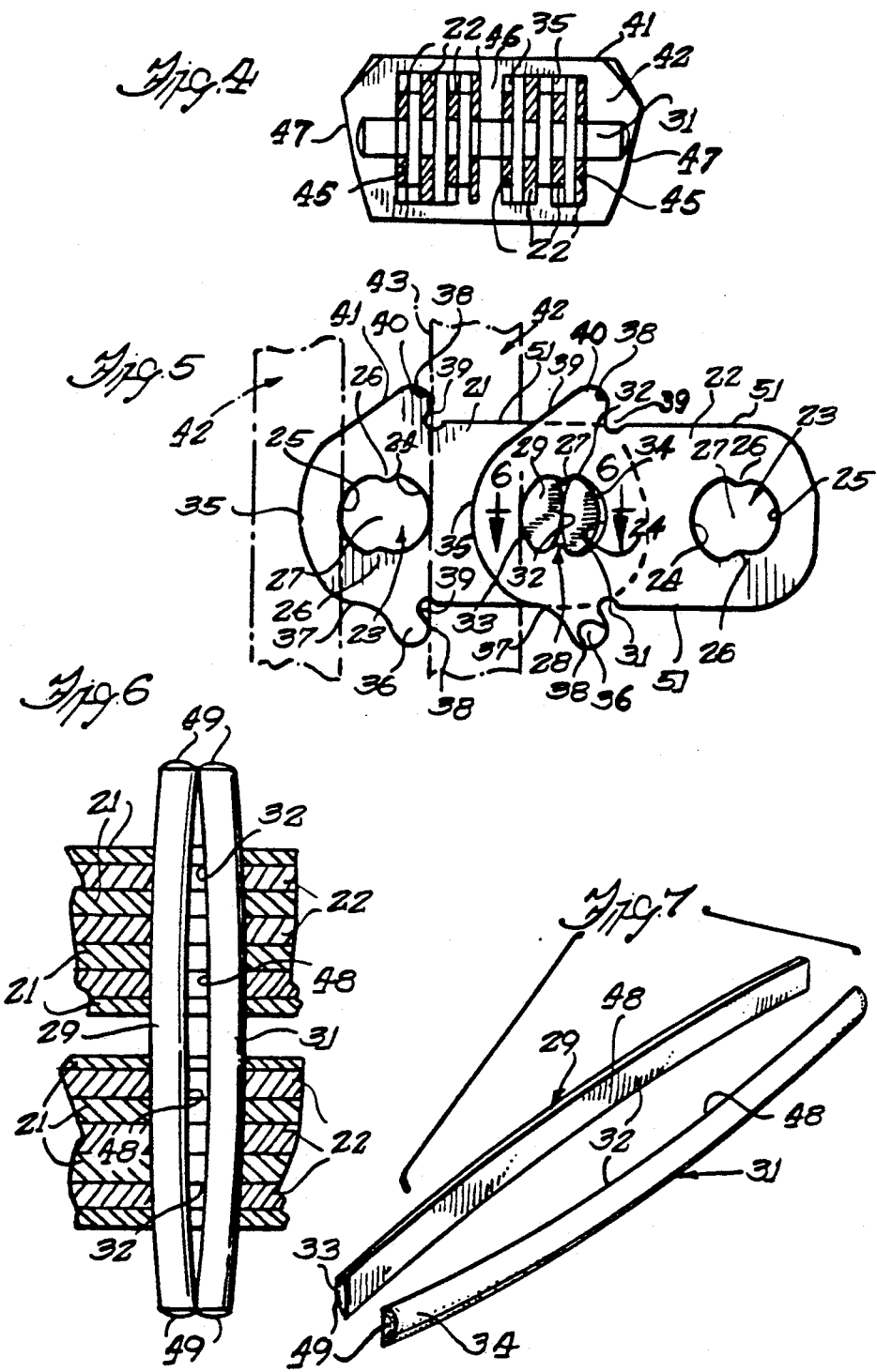

CHAIN-BELT

This is a continuation of application Ser. No. 416,704 now U.S. Pat. No. 5,009,631 filed Oct. 3, 1989, which is a divisional application of application Ser. No. 356,617, filed May 23, 1989, now issued U.S. Pat. No. 4,911,682, which was a continuation application of Ser. No. 114,335, filed Oct. 28, 1987, now abandoned.

The present invention relates to a chain belt, and more particularly to a pivot joint for articulation between adjacent sets of chain links in a chain-belt. Various types of pivot means have been utilized for the joining and articulation of chain links, such as cylindrical pivot pins, pin and rocker, etc. wherein the chain links are provided in sets that are interleaved together and have aligned apertures in the links that receive the pivot means. The chain links articulate as the chain wraps around a pulley or sprocket for the chain.

Chain links which are used for the manufacture of chain-belts, combining a chain and a plurality of load blocks, are especially suitable to provide a driving connection between a pair of pulleys, resulting in a variable ratio drive transmission. The load blocks are positioned on the chain between the spaced pivot means and have one or more windows therein receiving the chain links extending therethrough. The load blocks have tapered outer or end surfaces which engage the sheave faces of the pulleys to provide the driving engagement between the pulleys and the chain-belt.

For a single round pin as the pivot means, the ends of the pins could be headed or swaged beyond the outside or guide chain links at both ends of the pin or the guide links could have slightly smaller apertures to provide a force fit with the ends of the pin. In some forms of power transmission chain using a pair of similar pins or a pin and rocker, one of the pin members is longer than the other, and the shorter member is retained in position by guide links flanking the edges of the chain; the guide link having apertures only large enough to receive the longer of the pin members. Then the longer of the pins is press-fit or otherwise secured in the guide link aperture.

Another method of limiting lateral movement of the pins or pin and rocker pivot means is through the use of a locking clip or spring clip. For a locking clip, the ends of the pins or pin and rocker have grooves located slightly beyond the chain links, and a clip engages in the groove or grooves to retain the pins intact. Such a locking clip is shown in U.S. Pat. No. 3,939,721. Where a spring clip is used, a resilient retaining clip extends across the width of the chain with downturned ends that extend over the ends of the pins or pin and rocker and are bent inward below the pin ends as seen in FIG. 9 of U.S. Pat. No. 4,507,106. One problem with either locking clips or spring clips is that clips are difficult to assemble and are prone to breakage, leaving the pins free to move laterally in the link sets. The present invention overcomes the problems relative to retaining the pivot pins in a chain-belt without adding any additional structure thereto.

SUMMARY OF THE INVENTION

The present invention relates to a chain-belt comprising interleaved sets of a plurality of chain links having spaced apertures wherein the apertures of adjacent sets of links are laterally aligned to receive the pins of a joint for articulation of the chain. A small longitudinally extending camber is introduced into at least one of the pins which, when assembled, creates a spring load between the pins and links, which load is sufficient to retain the pins in their operative position during assembly and handling of the chain-belt. The use of the camber for the pins obviates the need for locking clips and a press fit between the pins and guide link is not necessary.

The present invention also relates to a chain-belt consisting of interleaved sets of chain links having spaced apertures for pivot means, wherein each link has a pair of oppositely disposed tabs adjacent one end of each link; the links in a lateral set having the tabs at alternating ends. Also, the spaced apertures in each link have a generally hour-glass shape with the pins received in the rounded ends of the apertures and the narrowed central portion located between the pins. The load blocks encircling the sets of links are located between adjacent tabs on the interleaved links; the tabs preventing undue rocking action by the load blocks and thus decreased wear on the edges of the links.

Another feature of the invention is the use of two reduced-width links in the outermost positions of a set of interleaved links, to save metal without sacrificing any torque-carrying capacity of the chain-belt.

Further objects are to provide a construction of maximum simplicity, efficiency, economy and ease of assembly, and such further objects, advantages and capabilities as will later more fully appear and are inherently possessed thereby.

DESCRIPTION OF THE DRAWINGS

FIG. 1 is a cross sectional illustration of a variable ratio pulley transmission showing one speed ratio position, the pulleys being joined by a chain-belt embodying the present invention.

FIG. 2 is a side elevational view of a portion of the chain-belt connecting the pulleys in FIG. 1 and incorporating the rocker joint of the present invention.

FIG. 3 is a top plan view of a portion of the chain-belt of FIG. 2.

FIG. 4 is a cross sectional view of the chain-belt taken on the line 4—4 of FIG. 2.

FIG. 5 is an enlarged partial side elevation view with portions removed to show details of the chain links and rocker joint.

FIG. 6 is a horizontal cross sectional view through a portion of the chain-belt taken on line 6—6 of FIG. 5.

FIG. 7 is an enlarged perspective view of the cambered pins removed from the chain-belt.

DESCRIPTION OF THE PREFERRED EMBODIMENT

Referring more particularly to the disclosure in the drawings wherein is shown an illustrative embodiment of the present invention, FIG. 1 discloses a variable pulley transmission 10 comprising a pair of pulleys 11,12 mounted on shafts 13,14, respectively. Each pulley includes a pair of flanges 15,16 or 17,18 drivingly connected by a chain-belt 19. One of the shafts is a driving shaft and the other is a driven shaft, and at least one flange of each pulley is movable axially relative to the opposite flange of the pair to vary the spacing between the flanges and thus vary the drive ratio of the transmission.

FIGS. 2 through 6 illustrate the power transmission chain-belt 19 of FIG. 1 which is constructed of sets of links 21 that are interleaved with adjacent sets of links 22; each link 21 or 22 having a pair of spaced apertures 23,23. Each aperture 23 consists of a generally hourglass shape having a pair of generally oppositely disposed rounded surfaces 24 and 25 separated by inward projections 26 forming a narrowed neck 27. The longitudinal axis of each aperture is rotated through approximately 4° from horizontal. The apertures in adjacent sets 21 and 22 of interleaved links are transversely aligned to receive pins forming an articulation or rocker joint 28 joining the adjacent sets of links and providing articulation therebetween. A rocker joint 28 comprises a pair of metal, generally D-shaped (in cross section) members or pins 29,31, each having a facing rocking surface 32 in contact with one another, and a pair of substantially semi-circular back surfaces 33, 34 respectively, which are generally conformably received in the link apertures 23. The rounded back surface 33 of pin 29 engages the surface 25 while the surface 34 of pin 31 is spaced from surface 24 of link 22 as seen in FIG. 5, and the rocking surfaces 32 contact at the aperture neck 27 so that the members can rock on each other. Likewise, surface 34 of pin 31 engages surface 25 of the aperture 23 in link 21, axially aligned with the above aperture of link 22, while surface 33 of pin 29 is spaced from the surface 24. This arrangement will be repeated in adjacent openings of links 21,22 with the chain in tension.

Each link 21 or 22 is provided with a pair of oppositely disposed tabs or ears 36,40 adjacent one rounded end 35 of the link and generally laterally aligned with the aperture 23 adjacent that end of the link. An inwardly curved lower surface 37 leads from the link end 35 to the lower tab 36 to terminate in a rounded end surface having a rearwardly facing flat surface 38 adapted to abut the side surface 43 of a load block 42. The tab is further provided with a rounded undercut surface 39 so arranged as to prevent interference with the assembly and operation of the load blocks thereon. An angularly inclined upper surface 41 extends from end 35 to upper tab 40, also terminating in a rounded end surface with a flat rear surface 38 and undercut corner 39.

Metal drive or load blocks 42 encompass the chain-belt 19 between adjacent rocker joints 28, each load block consisting of a one-piece member or constructed of a plurality of substantially identical block parts 44. Each load block 42 is of a generally trapezoidal shape, when viewed from the front, and may have a central "window" or opening to accommodate the sets of links, or two or three windows. In the illustrated embodiment block 42 includes a pair of windows 45 separated by a central strut 46 (FIG. 4) for receiving the chain-belt 19. Also, each block has oppositely disposed edges 47,47, which can be crowned or straight, acting to frictionally contact the correspondingly tapered flanges 15,16 and 17,18 of the pulleys, such as shown in FIG. 1.

FIGS. 4 through 6 more clearly disclose the links 21 and 22 of the chain-belt 19 and the rocker joints 28 extending through the apertures 23 of the interleaved links and projecting beyond the outermost links as seen in FIGS. 3, 4 and 6. One or both of the D-shaped pins 29 and 31 are slightly cambered, as at 48, along the longitudinal axis of the pin, the camber being exaggerated in FIGS. 6 and 7. If both pins are cambered, they are cambered in opposite directions. The cambered pins press against the rounded surfaces 25 of the link apertures 23 in alternating links 21 and 22 and are, therefore, self-retaining. Due to the camber, the outer ends 49 of the pins 29,31 bear against each other at the rocking surfaces 32. This load resulting from the camber is sufficient to retain the pins in operative position during handling and assembly. In operation of the transmission, the chain tension acts to flatten out the pins against each other and provide full rocking face contact.

Although the cambering of the pins eliminates the use of spring or locking clips to retain the pins in position in handling of the chain-belt, the pins may shift laterally during belt operation so as to contact the pulley flange faces. To reduce any damage to the pulley flanges, the ends 49 of the pins may be rounded or radiused. That the pins contacted the pulley faces was evidenced by slight wear on the flange surfaces and/or polishing of the ends of the pins. Also, the tabs 35 and 40 on the links 21 and 22 prevent tipping or rocking of the load blocks 42 on the chain, especially during articulation. Also, the curved surfaces 37 of tabs 36 allow the load blocks and links to rotate and articulate as the chain is wrapped around a pulley. With substantial elimination of rocking of the load blocks, wear on the upper and lower edges 51 of the links is substantially reduced, resulting in a much longer life for the chain. The undercuts 39 on the tabs obviates any interference of the corners of the load blocks with the links for ease of assembly on the chain.

Another aspect of the invention is the use of ranks or sets of links in which the outermost two links in each set of links is different, that is, have a width substantially less than the width of the other links in the same set or rank. FIG. 6 shows that the outermost links of the ranks 21 are approximately one-half the width of the interior links. Because the outside links carry less load than the remaining inside links 21, it is possible to decrease the width and thus save the amount of metal for a chain, without diminishing the torque-carrying capacity of the total chain-belt.

I claim:

1. A rocker joint for a power transmission chain constructed of an assembly of links and pivot members,
   the chain comprising a plurality of sets of links interleaved with other sets of links,
   each link having ends and a central body portion and a pair of generally round and spaced openings, each of said openings having a wall defined by a pair of arcs separated by spaced and generally inwardly extending portions,
   said inwardly extending portions being spaced such that one of the arcs is smaller than the other arc,
   said pivot members comprising a pair of pins having substantially identical cross-sectional shapes with front convex surfaces engaging and rocking on one another,
   each pin of a pair of pins having the front surface defined by a first radius, and a convex back surface defined by a second radius matching that of said smaller arc of said opening, said first radius being larger than said second radius,
   one of said pins of a pair of pins being received in the openings of one set of links between a pair of the extending portions thereof such that its back surface engages the surface defined by said smaller arc, thereby preventing substantial rotation of said pin relative to the links of that set,
   the other pin of said pair of pins being received in the openings of the interleaved set of links with the same relative relationship with said openings as said one set of links,
   the back surfaces of said pins being movable in the other openings of the links as the front surfaces move relative to one another when the chain articulates about its joints.

2. The rocker joint of claim 1 wherein said front and back surfaces are joined by curved surfaces, each of curved surfaces being defined by a third radius.

3. A rocker joint for a power transmission chain constructed of an assembly of links and pivot members, the chain comprising a plurality of sets of links interleaved with other sets of links, each link having a pair of spaced openings, each opening being defined by a pair of arcs, one of which has a smaller length than the other, the smaller arc being positioned outwardly of the center of the links, the lengths of said arcs being defined by the defining walls of substantially identical inwardly extending portions which converge and extend inwardly of said openings and short of the center thereof, one set of openings of one set of links being transversely aligned with the openings in another set of openings in the next adjacent set of interleaved links to thus form groups of aligned openings, a pair of pivot members in each group of aligned openings to both join the sets of links and to permit articulation of the chain, each pivot member having a convex front surface and a convex back surface, the front surfaces of each pivot member of a pair of pivot members opposing and rocking on one another and being defined by a first radius, the back surface of each pivot member being defined by a second radius smaller than that of said first radius, each back surface having a shape matching that of the smaller arc of said openings so as to engage said openings in one set of links which have the smaller radius and with the first surface of said pin engaging said inwardly extending portion defining the smaller arc, thus substantially preventing rotation of the pins so engaged when the chain articulates, the other of said pins of the pair of pins being free of engagement with the walls of said openings engaged by the other pin of the pair of pins, the pins of said pair of pins having the same relationship with the openings in the next adjacent set of links which is interleaved with said one set of links.

4. The rocker joint of claim 3 wherein said front and back surfaces are joined by curved surfaces defined by a third radius.

5. The rocker joint of claim 3 wherein said first radius of said first surface of one pin of said pair of pins is equal to said first radius of said first surface of the other pin of said pair of pins.

6. The rocker joint of claim 3 wherein said pivot members are D-shaped.

7. The rocker joint of claim 3 wherein said inwardly extending portions are vertically displaced across said opening.

8. The rocker joint of claim 3 wherein some of said sets of links include a load carrying means.

9. The rocker joint of claim 8, wherein said load carrying means further comprises a load block member.

10. The rocker joint of claim 9 wherein said load block member is oriented around said link.

11. The rocker joint of claim 9 wherein said load block member extends below said link.

12. The rocker joint of claim 3 wherein said links include at least one extending member depending from a body portion of said link.

13. The rocker joint of claim 12 wherein said extending member is located to define a first orientation for said links, some of said links being oriented in said first orientation, others of said links being oriented in a different orientation.

14. The rocker joint of claim 12 wherein said extending portion is a load carrying portion of said link.

15. The rocker joint of claim 12 wherein said extending portion acts to hold a load block member.

16. The power transmission chain-belt of claim 15 wherein each pivot member has a rounded back surface and each aperture has a complementary rounded surface cooperating with the pivot member surface to substantially prevent relative rotation therebetween.

17. The power transmission chain-belt of claim 16 wherein said pivot members are formed of surfaces of a plurality of differing radii.

18. The power transmission chain-belt of claim 17 wherein each pivot member having a convex front surface and a convex back surface, the front surfaces of each pivot member of a pair of pivot members opposing and rocking on one another and each being defined by a first radius, the back surface of each pivot member being defined by a second radius smaller than that of said first radius.

19. The power transmission chain-belt of claim 18 wherein said first radius of said first surface of one pivot member of said pair of pivot members is equal to said first radius of said first surface of the other pivot member of said pair of pivot members.

20. A power transmission chain-belt for driving connection between a driving pulley member and a driven pulley member, said chain-belt comprising:

a plurality of sets of links interleaved with adjacent sets of links, each link having a pair of longitudinally spaced apertures, load block means received within said links, said load block means having pulley flange engaging surfaces spaced apart a predetermined distance, the apertures of one set of links being transversely aligned with the apertures of an adjacent set of links, and a pair of generally oval pivot members in each aligned set of apertures, at least one of said apertures being of generally hour-glass shape with enlarged rounded ends joined by an intermediate neck portion, said enlarged rounded ends adapted to receive a pivot member therein.

21. The power transmission chain-belt of claim 20 wherein said intermediate neck portion of said aperture includes a plurality of substantially inwardly extending portions which converge and extend vertically inwardly of said openings.

* * * * *